US012771704B2

(12) United States Patent
Morrison et al.

(10) Patent No.: US 12,771,704 B2
(45) Date of Patent: Oct. 20, 2026

(54) INTERCEPTING WORTHLESS REQUESTS AT THE NETWORK EDGE USING MACHINE LEARNING

(71) Applicant: Ping Identity International, Inc., Denver, CO (US)

(72) Inventors: Wayne Anthony Morrison, Bristol (GB); Guillaume Rene Sauthier, Seyssinet-Pariset (FR); Raminder Kaler, Redwood City, CA (US); Joachim Andres, Seyssins (FR)

(73) Assignee: Ping Identity International, Inc., Denver, CO (US)

(*) Notice: Subject to any disclaimer, the term of this patent is extended or adjusted under 35 U.S.C. 154(b) by 241 days.

(21) Appl. No.: 18/431,852

(22) Filed: Feb. 2, 2024

(65) Prior Publication Data

US 2024/0267397 A1 Aug. 8, 2024

Related U.S. Application Data

(60) Provisional application No. 63/443,337, filed on Feb. 3, 2023.

(51) Int. Cl.
*H04L 9/40* (2022.01)

(52) U.S. Cl.
CPC ...... *H04L 63/1425* (2013.01); *H04L 63/1491* (2013.01); *H04L 63/20* (2013.01)

(58) Field of Classification Search
CPC .. H04L 63/1425; H04L 63/1491; H04L 63/20
See application file for complete search history.

(56) References Cited

U.S. PATENT DOCUMENTS 10,303,576 B1 5/2019 Seymour et al.
10,574,697 B1 * 2/2020 McClintock ........ H04L 63/1491
11,374,945 B1 * 6/2022 Senecal ............... H04L 63/1416
(Continued)

OTHER PUBLICATIONS

"Forgerock Autonomous Identity Ushers in a New Era of AI-driven Identity Governance and Administration" (4 pages) https://www.pingidentity.com/en/company/ping-newsroom/forgerock-archives/news/forgerock-autonomous-identity-ushers-new-era-ai-driven-identity-governance.html (Year: 2021).*
(Continued)

*Primary Examiner* — Amir Mehrmanesh
*Assistant Examiner* — Thomas A Gyorfi

(57) ABSTRACT

The technology screens malicious and probing requests to establish an authorized session, collectively worthless requests, directed to a protected application, by using an identity gateway (IG) positioned as a network edge component on a network. Screening occurs before starting an authentication or authorization journey or other resource consuming interaction with a protected application. The screening setup involves provisioning a ML classifier at an edge server accessible by the IG. When the request to establish an authorized session is received by the IG, screening involves the ML classifier accepting features and outputting a score predicting whether the request is worthless. The IG compares the score to a threshold. Based on the score, the IG may determine to limit the worthless request at the network edge so that the request does not invoke the authorization journey or perform the resource consuming interaction.

19 Claims, 7 Drawing Sheets

(56) References Cited

U.S. PATENT DOCUMENTS

| | | | | |
|---|---|---|---|---|
| 12,301,597 | B1 * | 5/2025 | Alhazmi | H04L 41/16 |
| 2015/0205708 | A1 | 7/2015 | Michelsen | |
| 2017/0295062 | A1 | 10/2017 | Tang | |
| 2021/0004253 | A1 | 1/2021 | Barnes et al. | |
| 2021/0072966 | A1 | 3/2021 | Zong et al. | |
| 2021/0226987 | A1 * | 7/2021 | Summers | H04L 63/1408 |
| 2023/0315840 | A1 * | 10/2023 | Cambric | G06F 21/34 726/23 |

OTHER PUBLICATIONS

Detection Methods—How to Detect Bot Traffic?, Netcea, Apr. 30, 2020, 5 pages, (downloaded Jan. 18, 2024 from https://web.archive.org/web/20221102132300/https://netacea.com/glossary/bot-traffic-detection/).

Huang, Z., Extensions to the k-Means Algorithm for Clustering Large Data Sets with Categorical Values, Data Mining and Knowledge Discovery 2, Sep. 1, 1998, pp. 283-304.

Creating Trees for Push Authentication and Registration, ForgeRock.com, archived Dec. 3, 2022, 5 pages (downloaded Dec. 30, 2022 from https://web.archive.org/web/20211203063029/https://backstage.forgerock.com/docs/idcloud-am/latest/authentication-guide/authn-mfa-trees-push.html).

Web Policy Agents 5.10.1, User guide, ForgeRock.com, Jun. 2022, 67 pages (downloaded Dec. 27, 2020 from https://backstage.forgerock.com/docs/openam-web-policy-agents/5.10/user-guide/openam-web-policy-agents-5.10-user-guide.pdf).

Idenity Gateway v7.1.2, Configuration Reference, ForgeRock.com, Apr. 2022, 470 pages (downloaded Dec. 27, 2022 from release dates at https://backstage.forgerock.com/docs/ig/7.1/release-notes/doc-updates.html).

Java Policy Agents 5.10.1, User guide, ForgeRock.com, Jun. 2022, 79 pages (downloaded Dec. 27, 2020 from https://backstage.forgerock.com/docs/openam-jee-policy-agents/5.10/user-guide/openam-jee-policy-agents-5.10-user-guide.pdf).

Honeypots in Cybersecurity Explained, Crowdstrike Marketplace, Mar. 9, 2022, 16 pages (downloaded Jan. 18, 2024 from https://www.crowdstrike.com/cybersecurity-101/honeypots-in-cybersecurity-explained/).

ForgeRock Identity Cloud Docs—Identity Cloud, About Autonomous Access, ForgeRock.com, 2022, 27 pages (downlaoded Dec. 12, 2022 from(https://backstage.forgerock.com/docs/idcloud/latest/auto-access/chap-about-autoaccess.html).

Protect Users Witthout Frustrating Them Using AI-Driven Behavorial Biometrics, White Pater, Behavion Sec, 2020, (retrieved Dec. 14, 2021 from https://www.behaviosec.com/wp-content/uploads/2020/11/bhs-whitepaper.pdf).

Behavioral Biometrics for Mobile, BioCatch, 2021, 3 pages (retrieved Dec. 14, 2021 from https://www.biocatch.com/hubfs/New%20Boilerplate/BC%20SB%20Mobile%20Data%20v6%20NBP.pdf).

Innovating the Customer Experience Without Opening Fraud Floodgates, BioCatch, 10 pages (retrieved Dec. 14, 2021 from https://www.biocatch.com/hubfs/WP-Innovate-Customer-Experience-Without-Fraud.pdf).

Threat Matrix Guide, ID Dataweb, 7 pages (retrieved Dec. 14, 2021 from https://docs.iddataweb.com/docs/threatmetrix-1).

Cichonski et al., "Computer Security Incident Handling Guide", National Institute of Standards and Technology, U.S. Department of Commerce, Special Publication 800-61, Revision 2, http://dx.doi.org/10.6028/NIST.SP.800-61r2, Gaithersburg, MD, 2012, 79 pages.

"Hardening your cluster's security", Kubernetes Engine, (https://cloud.google.com/kubernetes-engine/docs/concepts/security-overview), Jul. 2019, 10 pages.

Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.

"Configuring Vertical Pod Autoscaling", Kubernetes Engine, Google Cloud (https://cloud.google.com/kubernetes-engine/), Aug. 14, 2019, 8 pages.

Wilkin, "Kubernetes Deployment Dependencies", https://medium.com/google-cloud/kubernetes-deployment-dependencies-ef703e563956, Jul. 2, 2018, 21 pages.

"Vertical Pod Autoscaling", Kubernetes Engine, https://cloud.google.com/kubernetes-engine/docs/concepts/verticalpodautoscaler), Aug. 29, 2019, 8 pages.

Sakimura et al, "OpenID Connect Dynamic Client Registration 1.0 incorporating errata set 1", https://openid.net/specs/openid-connect-registration-1_0.html, Oct. 1, 2019, 19 pages.

Jayanandana, "Enable Rolling updates in Kubernetes with Zero downtime", https://medium.com/platformer-blog/enable-rolling-updates-in-kubernetes-with-zero-downtime-31d7ec.388c81, Sep. 27, 2018, 6 pages.

"FAQ: IDM/OpenIDM performance and tuning", https://backstage.forgerock.com/knowledge/kb/article/a32504603, Jun. 26, 2019, 7 pages.

Amazon; AWS Elastic Beanstalk Developer Guide; Aug. 2019; 924 pgs (https://web.archive.org/web/20190805110626/https:// docs.aws.amazon.com/elasticbeanstalk/latest/dg/awseb-dg.pdf).

* cited by examiner

```
{
  "endpoint":        313a Expression<URI>         [REQUIRED - Endpoint of the Traffic
                                                     Analysis service.]
  "endpointHandler":313bHandler                   [OPTIONAL - Handler to access Traffic
                                                     Analysis service. Default to
                                                     ForgeRockClientHandler.]
  "verbose" :        313c Expression<Boolean>     [OPTIONAL - True if risk-scoring is to be
                                                     accompanied by verbose risk report -
                                                     default is false.]
  "thresholds": {   313d object (1)
    "low":                 Expression<Integer>    [OPTIONAL - Threshold equal or below which
                                                     the risk score is considered low. Range
                                                     is from 0-100 - default is 30.]
    "medium":              Expression<Integer>    [OPTIONAL - Threshold equal or below which
                                                     the risk score is considered medium.
                                                     Range is from 0-100 - default is 70.]
  },
  "assessments": {  313e  object                  [OPTIONAL - The set of risk assessments to
                                                     be scored (2). Default scores all
                                                     available risk assessments.]
    "anomalyDetection":  Expression<Boolean>      [OPTIONAL - Set to true to enable
                                                     Anomaly-detection. Default is true.]
  }
}
```

FIG. 3B

```
{
  "riskScore" 344a: String        [Risk score - low, medium, high, uncertain. (1)]
  "reasonText"344b: String        [Textual representation. (2)]
}
```

FIG. 3C

```
{
  "riskHandlers" {            object (1)
    "low":       Handler      [OPTIONAL - Handler called in the event of a low risk-scored
                                 request. Default propagates request (2).]
    "medium":    Handler      [OPTIONAL - Handler called in the event of a medium risk-
                                 scored request. Default propagates request (3).]
    "high":      Handler      [OPTIONAL - Handler called in the event of a high risk-
                                 scored request. Default propagates request.]
    "uncertain": Handler      [OPTIONAL - Handler called in the event of an uncertain
                                 risk-scored request. Default propagates request.]
    "unknown":   Handler      [OPTIONAL - Handler called in the event of an risk-score
                                 that is not configured. Default propagates request.]
}
```

FIG. 3D

INTERCEPTING WORTHLESS REQUESTS AT THE NETWORK EDGE USING MACHINE LEARNING

CROSS-REFERENCE

This application claims priority to and the benefit of U.S. Provisional Application 63/443,337 titled "Intercepting Worthless Requests at the Network Edge Using Machine Learning,' filed 3 Feb. 2023. The priority application is incorporated by reference for all purposes.

RELATED APPLICATIONS

This application is related to the following commonly owned applications which are incorporated by reference for all purposes as if fully set forth herein:

U.S. application Ser. No. 17/673,692 titled "Autonomous Access Risk Aggregation Across 3rd Party Applications," filed Feb. 16, 2022 which claims the benefit of U.S. Provisional Application 63/150,042, filed 6 Feb. 2021.

INCORPORATIONS

The following materials are incorporated by reference for all purposes:

Bot Traffic Detection, 2020 Apr. 30, NETACEA, the section titled "How can you spot bot traffic" hxxps://web.archive.org/web/20221102132300/https://netacea.com/glossary/bot-traffic-detection/TECHNICAL

FIELD

The field of technology involves network security and machine learning.

BACKGROUND

Malicious and probing requests (aka "worthless requests") can consume considerable resources and aid malicious parties in mapping both intrusion paths and denial of service attacks. In general, requests prior to authentication of a user are treated as requests to establish an authentication session. With layered defenses, an authentication journey processes requests, solicits risk scores from multiple sources, determines whether to step-up to multi-factor authentication, and ultimately determines whether to grant an authentication request, to authenticate the requested session. Thus, an authentication journey can be resource intensive. Resource intensive processes can be targets of distributed denial of service attacks.

When a probing request is detected, the reconnaissance attempt by an attacker may be proactively addressed by denying access or providing disinformation through fake request acknowledgements that contain nonsense information, or by redirecting the requests to honeypot systems. Honeypot systems are systems that appear to be legitimate network systems hosting protected applications and valuable data, but in reality, are disconnected from protected applications and surveil the attacker.

BRIEF DESCRIPTION OF DRAWINGS

FIG. 3B illustrates example properties of a Traffic Analysis Assessment Filter.

FIG. 3C illustrates example properties of a Traffic Analysis Context.

FIG. 3D illustrates example properties of a Traffic Analysis Routing Filter.

ACRONYMS

Figure 1:
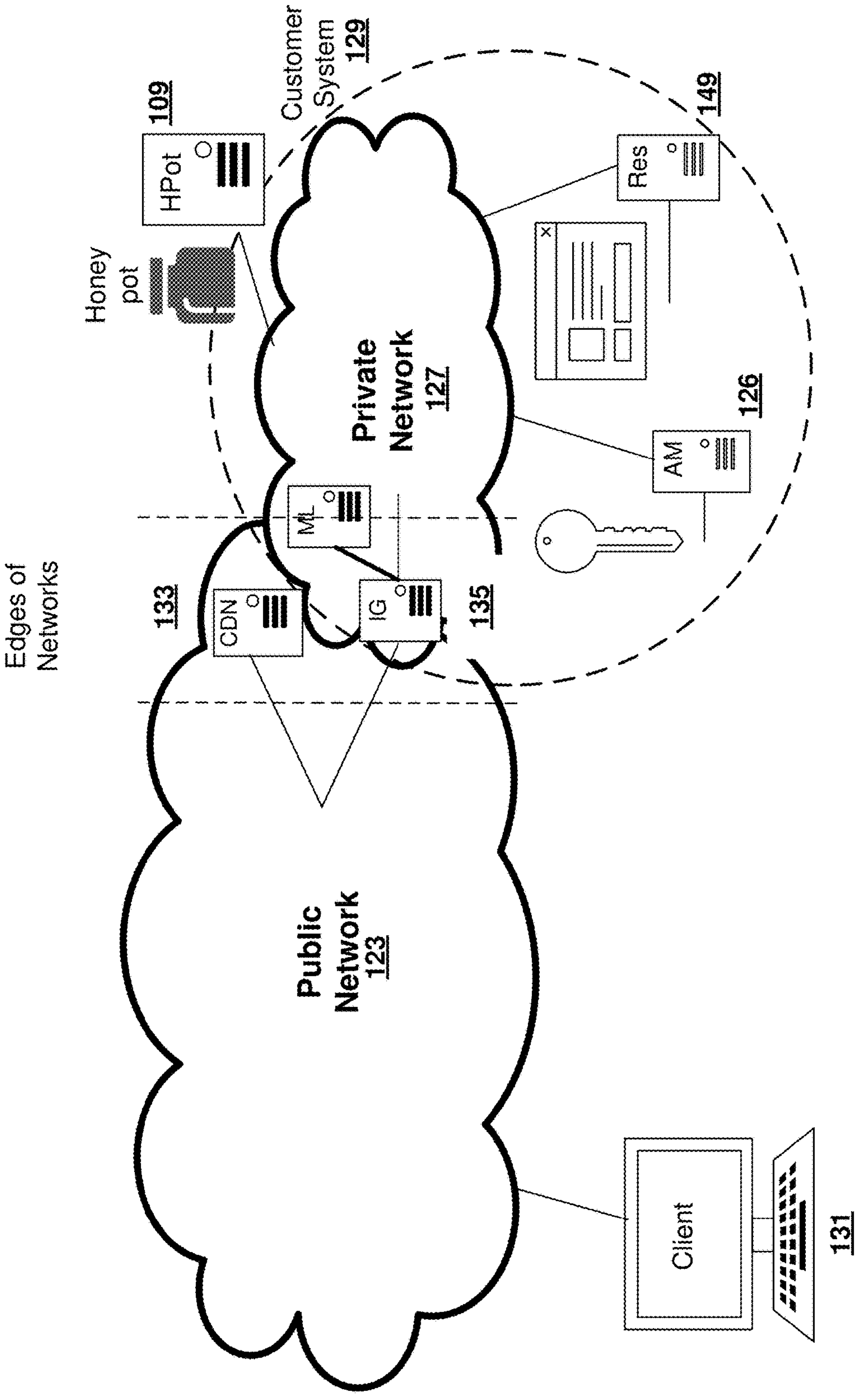
FIG. 1 illustrates system components invoked by a client request passing from a client through the disclosed proxy technology to an authentication journey and ultimately to a requested resource or application.

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed here:

| | |
|---|---|
| CNN | Convolutional Neural Network |
| HTTP | HyperText Transfer Protocol |
| IG | Identity Gateway |
| IIS | Internet Information Services |
| JPA | Java Policy Agent |
| ML | Machine Learning |
| LSTM | Long-Short Term Memory |
| OS | Operating System |
| ReLU | Rectified Linear Unit |
| RNN | Recurrent Neural Network |
| SVM | Support Vector Machine |
| WPA | Web Policy Agent |

DETAILED DESCRIPTION

An authentication journey is an expensive way to screen out bots and other high-risk efforts to gain access to resources. This is because authentication journeys leverage multiple steps, can seek risk analysis from multiple sources, and often step-up to multi factor authentication. Authentication journeys are implemented using centralized resources that can become heavily encumbered. Accordingly, prescreening of authentication attempts at the edge, before invoking authentication journeys, is desired.

The technology disclosed applies Machine Learning (ML) classifiers at the edge, to incoming requests, such as requests requiring authentication (e.g. to obtain an SSO token) as well as requests requiring authorization, requests that have been authenticated (e.g. requests that already have an SSO/access token), or requests that do not require authentication or authorization. The ML classifiers are used to estimate risk associated with a request and to enable channeling of the request. One architecture, that readily combines signals for a particular organization and signals common across organizations, uses skip connections to supply signals to both commonly trained processing coefficients and coefficients trained for an organization's specific users.

Meeting Challenges at the Edge

Positioning a trained machine learning classifier at the edge of a customer system for pre-screening requests follows up on inventive work on training a machine learning classifier for use during an authentication journey. Some of the related work is the subject of another patent application. Feature selection, encoding of input signals, classifier architecture and training are discussed in the following paragraphs.

During and after an authentication journey, a rich set of signals or features are available. Some signals are collected from the incoming request. Others are collected from interactions between requesting user and modules implementing the journey. Yet others are provided by third party services, responsive to requests for analysis of selected journey signals. The following list are examples of signals usable during an authentication journey:

- user ID,
- geographical country from which the request originated,
- geographical city from which the request originated,
- device type from which the request originated,
- day of week upon which the request was received,
- dayparting upon which the request was received,
- OS type installed on the device from which the request was sent, and
- user agent from which the request was sent, And granular level observations useful for analyzing requests, such as:

- request headers included with the request,
- header order by user agent, and
- request order e.g., if the requests are made out of order.

Pre-screening generally refers to review of requests prior to forwarding them to an authentication journey, target application, or other resource. One use case for pre-screening is detection of bot activity, including probing and attempted intrusion. Of course, appropriate training data allows the technology disclosed to be applied to other risky behavior that can be screened without initiating an authentication journey or after the authentication journey is complete.

Input data for pre-screening, also usable for screening during an authentication journey, is a variable length string of tokens. Tokens are preferred over one-hot encoding due to the variable number of signals available particular requests.

Classifiers that work well with categorical data, such as some of the tokens above, and that use relatively small training data sets include K-mode classifier (similar to K-means), and support vector machine (SVM). These classifiers train a modest number of coefficients, especially as compared the number of coefficients to be trained in a deep learning system. The number of coefficients to be trained is in the hundreds or thousands, rather than the millions.

Another category of classifiers that handle sequences of tokens are recurrent neural networks (RNN), including long short-term memory (LSTM) classifiers. These classifiers generally process the sequence marked with the beginning token and an end token. As the sequences input, hidden states are updated. These classifiers output classification score or category upon receipt of the end token.

Recurrent neural networks (RNNs) are an alternative to convolutional neural networks for processing sequential data, such as time series, that implement a different parameter-sharing scheme. Recurrent neural networks apply the same operation to each token input. The operation takes as input the memory of the previous tokens and the new input. It updates the memory and optionally emits an output, which is either passed on to subsequent layers or is directly used as model predictions.

The main advantage of recurrent neural networks over convolutional neural networks is that they are, in theory, able to carry over information through infinitely long lists via memory. Furthermore, recurrent neural networks can naturally process sequences of widely varying length, such as a plurality of text segments of differing lengths of token lists. However, convolutional neural networks, combined with various tricks (such as dilated convolutions), can reach comparable or even better performances than recurrent neural networks on sequence-modelling tasks, such as audio synthesis and machine translation. Moreover, because recurrent neural networks apply a sequential operation, they cannot be easily parallelized and hence are much slower to compute than convolutional neural networks.

Transformers and other encoder-decoder schemes also can be used with pre-training. For instance, an encoder pre-trained for use during an authentication journey would be able to encode the subset of signals available during pre-screening. Then, only the decoder would need to be trained to recognize bot activity.

A transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

Convolutional neural networks (CNN) also could be used with zero padding. Use of a CNN requires a relatively large set of training data. In some implementations, initial layers of the CNN can be pre-trained and frozen, akin to training of an encoder-decoder. Then, transfer learning can be exploited to leverage more general training data. Each convolutional layer scans the input with several filters to quantify the match between the filters and the sequence. As in fully-connected neural networks, a nonlinear activation function (commonly ReLU) can be applied at each layer. Next, at least one pooling operation can be applied, which aggregates the activations in contiguous bins across the positional axis, commonly taking the maximal or average activation for each channel. Pooling reduces the effective sequence length and coarsens the signal. The subsequent convolutional layer composes the output of the previous layer. Finally, the output of the convolutional layers can be used as input to a fully-connected neural network to perform the final prediction task. Hence, different types of neural network layers (e.g., fully-connected layers and convolutional layers) can be combined within a single neural network.

The fundamental difference between a densely connected layer and a convolution layer is this: Dense layers learn global patterns in their input feature space, whereas convolution layers learn local patterns. In the case of images, patterns found in small 2D windows of the inputs. This characteristic gives convolutional neural networks two interesting properties: (1) the patterns they learn are translation invariant and (2) they can learn spatial hierarchies of patterns.

Supervised training of classifiers can use data from previously completed authentication journeys. Other ground truth data sets also may be available, such as data from bot activity detected using blacklists or reputation-bases solutions such as Google's reCAPTCHA™. A third source is ethical or white hat hackers such as Bugcrowd. The ForgeRock Identity Management environment produces logs from authentication journeys that include reliable detection of requests that can be pre-screened. Similarly, ground truth can be harvested from logs generated by tools equipped with blacklists of known bot activity. Examples of non-bot activity are easier to harvest than reliably classified examples of bot activity. It is helpful for examples of bot activity be reliably labelled, because false positives during pre-screening are undesirable.

Unsupervised training of classifiers can also use data from previously handled requests, using the ground truth to provide meaning to clusters or other machine-learning derived classifications. Anomaly detection, which is the subject of a co-pending application, may seek deviations from previous patterns. When a user's access pattern changes, the change itself may be a noteworthy event. Also, unsupervised learning classifiers may identify hitherto-unknown but emerging patterns of malicious activity.

The logs from authentication journeys are useful because of the analysis applied during a journey. See, e.g., the authentication journey show in 2B and discussed in "Section Architecture at the edge, Authentication Journey" below. The analysis during a journey includes processing of signals available and useful for pre-screening. Logs can be secured from multiple customers in a consistent format. The log entries can be anonymized for use in ML training. It follows from use of logs that training is performed in batches, not continuously. Thus, the trained machine learning classifier is not intended to replace a continuously updated blacklist of bot sites.

Examples of features usable to detect bot traffic include:

Unusually high page views.

Unfamiliar referral traffic from a small number of sites.

Unusual bounce rates.

Unusual interactions with visual elements (including lack of interaction).

Unusual region driving spikes in traffic.

Unusually low time spent on navigating page.

Unusual average session duration.

Unusual timing of events per page.

Unusually high frequency of visits from an IP address.

The features listed here are intended just as examples and are neither compulsory nor exhaustive.

Transfer learning can be leveraged during training. For instance, a machine learning classifier can be trained to perform an authentication risk scoring task using a full set of features that become available during authentication journeys. Then, the training can be updated using fewer input features, just those features available for pre-scanning. This updating is a particularly clear path for encoder-decoder, as the encoder remains unchanged and a decoder can be trained or updated. Similarly, clustering produced by general K-mode clustering can be a starting point for refined clustering using bot-specific clustering of pre-screening signals.

Architecture at the Edge

FIG. 1 illustrates system components invoked by a client request passing from a client through the disclosed proxy technology to an authentication journey and ultimately to a requested resource or application. Physical and logical networks and systems are involved. A public network 123 sends packets to a private network 127 from the client 131 in a client request. The client request ultimately seeks access to the resource 149. An interesting use case is when access requires authentication by the access manager 147.

The private network 127 is part of a customer system 129. Customer or hosted hardware can host an access manager 126 and server resources 149. The access manager 147 handles authentication journeys. The resource server 149 can provide virtually any type of content or data in response to a client request received over the public network 123. Some components can be connected to both public and private networks. When copies proxy, cache or DNS servers are geographically distributed, they positioned are at the edge of the public network. Custom or hosted hardware may also include, or may lead to, a honeypot system 109.

We speak of content delivery networks (CDNs) 134 as being positioned at the edge 125 of the public network 123. CDNs supplied by Akamai, Limelight and the like cache content at data centers position close to customers in order to reduce latency, for instance when distributing streaming content. Streaming suffers when packets need to be resent, because an audio or video stream stutters instead of replaying smoothly. Akamai describes itself in 2022 as having over 300,000 servers distributed through one hundred thirty-six countries. These servers are referred to as positioned at the edge of the Internet because of their geographic distribution. DNS servers also are geographically distributed to reduce browser latency when resolving URLs to IP addresses. Similarly, identity gateways 135 that protect customer systems 129 can be positioned at the edge of the Internet, which also can be described as an edge of a customer system.

The pre-screening reverse proxy technology 135 operates alternatively as an identity gateway (IG), web policy agent (WPA), JAVA policy agent (JPA) or other component running on hardware at or near the entry for packets into the customer system 129. Screening and routing components such as a packet or protocol firewall or a load balancer can handle the packets before the IG pre-screens them. The IG pre-screens the packets before allowing them to be routed to an access manager for an authentication journey.

The pre-screening reverse proxy 135 preferably is on the same local area network or even in the same rack as a machine learning model 136 that assesses risk. Alternatively, a low latency connection can forward requests from the proxy 135 to the model 136 for risk assessment. This can include most initial requests to connect to a resource 149. However, some resources can be classified as not requiring or bypassing authentication for access. For example, pre-screening reverse-proxy 135 could be configured to send non-enforced URLs along predetermined routes.

The ML model 136 returns a numerical or categorical score, based on arguments sent by the proxy 135. This score may be used by pre-screening reverse proxy 135 to help direct the authentication journey.

Next, a particular example with the pre-screening reverse proxy as an Identity Gateway is discussed.

Example: Identity Gateway as an Edge Component

Figure 2A:
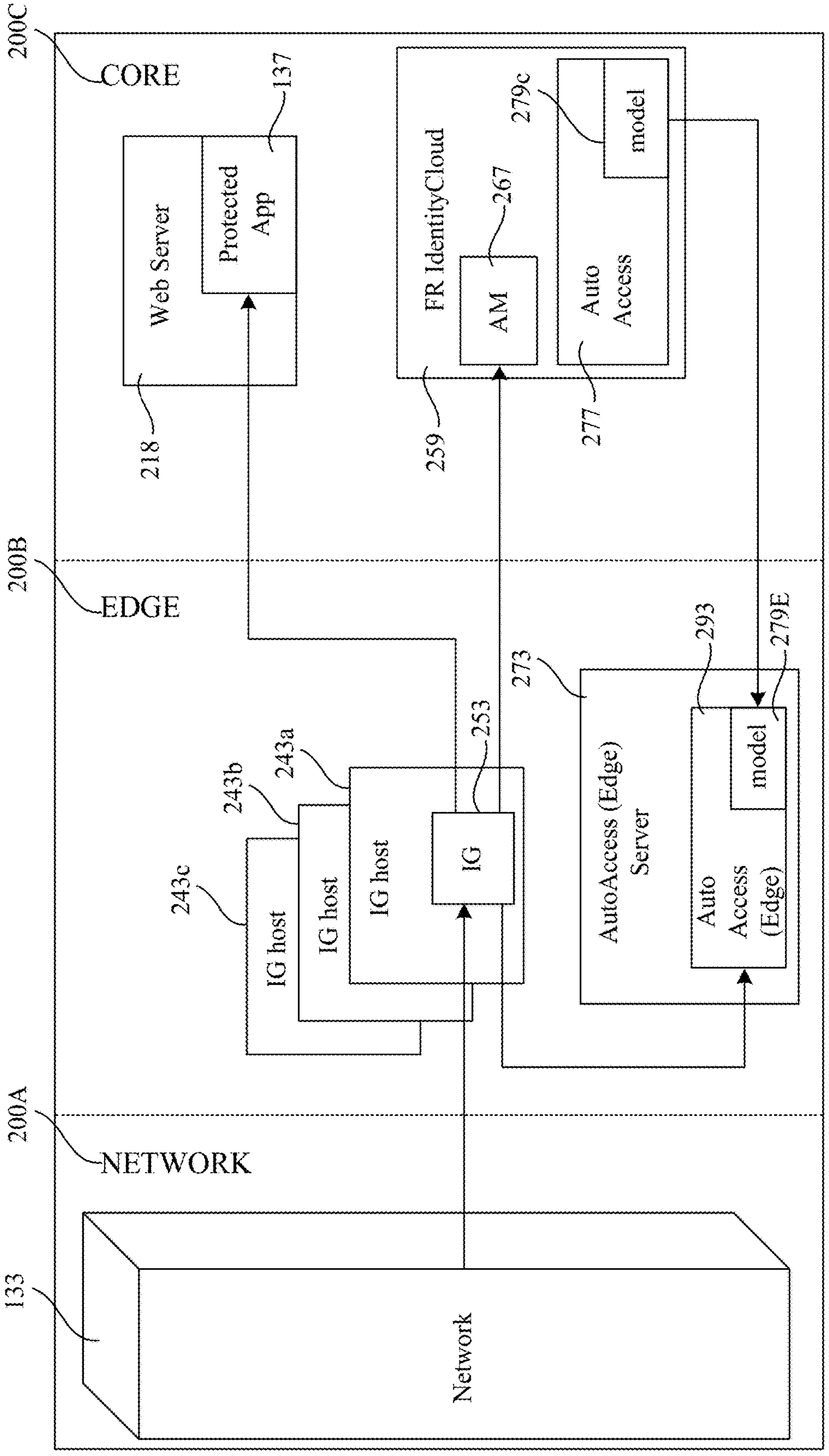
FIG. 2A illustrates an example implementation using an Identity Gateway as an edge component and Machine Learning models that leverage training from multiple customer networks.

FIG. 2A illustrates an example implementation using an Identity Gateway as an edge component and machine learning models that leverage training from multiple customer local networks.

Diagram 200 is an example implementation of the general environment 100, including network 200A, edge 200B, core 200C.

Network 200A includes network 133, and represents the abstraction of systems that could interface with an instance of edge component Identity Gateway 253 and seek to communicate requests to protected app 137. Network 133 may include network systems that would often be considered network edge systems, such as firewalls, load balancers, and the like.

Edge 200B represents the systems that receive requests on route to systems in Core 200C that will process the request. Edge 200B include Identity Gateway hosts 243*a-c* that each contains a respective identity gateway 253, and Autonomous Access server 273 containing an edge instance of Autonomous Access 293 including ML model 279E. In this example, the identity gateway is ForgeRock Identity Gateway, and Autonomous Access 293 is ForgeRock Autonomous Access, a service available on ForgeRock Identity Cloud.

A request that is received by the instance of Identity Gateway 253, at one of IG hosts 243*a-c*, may be modified by Identity Gateway 253. If the request is modified, the reasons for modification may include transforming the request or adding context to the request. Contexts are information that can be interrogated in downstream routes. Further discussion of context follows, below, during discussion of FIG. 3.

Identity Gateway 253 may provide the request (whether modified or not) to Autonomous Access edge instance 293 as input to ML model 279E, and subsequently, receive a score from Autonomous Access edge instance 293.

Identity Gateway 253 may use the received score to determine a risk score for the request. Identity Gateway 253 may treat the received score as a risk score itself, or may modify the received score value (e.g., by weighting, by normalizing, or similar operations) to obtain the risk score, or may use the received score as one input of a multivariate function that provides the risk score.

Based on the risk score, the request is assigned to a risk level that classifies how confident the request is a worthwhile request. Whether to forward the transformed request to authentication, and/or the protected application may be decided based on the assigned risk level. Example risk levels may be "high," "medium," and "low." Other risk levels, such as "uncertain" or "unknown" may be employed when the request falls in a pattern outside of how ML models were trained, or if a provided risk level does not match the current Identity Gateway configuration.

Autonomous Access edge instance 293 is hosted on Autonomous Access Server 273, and is configured with ML model 279E. ML model 279E may be a copy of ML model 279C without additional training. Alternatively, ML model 279E may be based on Autonomous Access 279C but include additional training with additional observations that are specific to a local network, based on the customer's local network logs. The additional observations may include specific data such as recent entries in local network logs, employee access and request patterns, and the like. Yet alternatively, ML model 279E could be trained solely or primarily based on the customer's local network logs, if sufficient training data were available. More information on training is found below, in section "Training and Retraining the ML model".

Core 200C represents the systems that server the customer and which are reached after being routed through Identity Gateway 253. Core 200C includes web server 218 hosting protected application 123, and ForgeRock Identity Cloud 259 hosting ForgeRock Access Management 267 (which is a particular implementation of access manager 126), and an instance of ForgeRock Autonomous Access 277 including ML model 279C.

Protected application 123 receives the request, if the request was found to carry low risk, or if medium risk mitigation steps were successful (e.g., the user performed step-up authentication or authorization).

ForgeRock Identity Cloud 259 uses Google Cloud Platform (GCP)-native network security features that serves multiple customer environments and services. Network communications are strictly controlled using Kubernetes network policies. At the service level, customer data is stored within a customer environment comprising a dedicated trust zone that shares no code, data, or identities with other customers' environments. At the physical level, ForgeRock Identity Cloud 259 provides encryption of data at rest, so all data is encrypted when written to a hard drive and decrypted when read. In another implementation, Amazon Web Services (AWS) or Azure can be utilized. AWS is an on-demand cloud computing platform hosted by Amazon. Azure is a cloud computing platform hosted by Microsoft. Both platforms are alternatives to GCP, and both also offer Software as a Service, Platform as a Service, and Infrastructure as a Service. Still other services with cloud computing for hire could be used as alternatives to host Identity Cloud.

Here, ForgeRock Identity Cloud 259 includes the role access manager 126, through ForgeRock Access Management 267. When a local network policy requires authentication of a request, or when the request was found to carry a risk level that requires authentication, Access Management 267 may bring the user through an authentication journey dictated by the local network policy or the risk level classification. Access Management 267 may log characteristics of an authentication request, such as the data included in the authentication request, the steps taken in the authentication journey started by the authentication request, and ultimately whether the authentication journey succeeded or failed.

The instance of Autonomous Access 277 hosted on Identity Cloud 259 trains ML model 279C on training data available through hosted on Identity Cloud 259. Since Identity Cloud 259 protects multiple customer networks, the amount of available event data from which to train ML model 279C most often exceeds the event data available to any single customer. Additionally, the breadth of event data from multiple customer networks means that once trained, ML model 279C may be able to detect emergent malicious or probing techniques, even before a particular customer's network only encounters the malicious or probing technique.

ML model 279C, once updated by training, may be sent to one or more networks with Autonomous Access server 273 at the edge to update ML model 279E. A network administrator may elect to use the received copy of ML model 279C as ML model 279E for the network under his or her control. As another option, a local network may further train ML model 279E using training data specific to the local network, via an edge instance of Autonomous Access 293, as a manner of customizing the ML model to fit that particular network's recent security needs.

Aspects of the edge architecture can impact request latency. Latency is addressed below, as part of section "Position and Deployment," below.

Training and Retraining the ML Model

Training may involve using customer-specific data to train customer-specific models, and deploying those customer-specific models to edge servers that are geographically proximate to customer IG hosts.

An advantage of custom training models is that the models become specific to the customer's network security needs.

As mentioned in the section Example: Identity Gateway as an edge component, above, training could also involve first training a model in a central location, such as Autonomous Access 277 hosted on Identity Cloud 259. Then, providing the model at the edge server, such as Autonomous Access 293 for further training. And thereafter, use. Identity Cloud customers could subscribe and permit their logs to be part of the training process, after being hashed and/or otherwise protected from data leakage.

The two-part training approach, detailed in the example, provides advantages that are more than the sum of its parts.

Initially training ML model 279C in on Identity Cloud 259 means that it can take advantage of audit logs and access logs related to multiple customers. For example, ForgeRock historical audit logs and ForgeRock access logs can provide history of previous end-to-end request/response flows from multiple networks owned by various customers. It also can take advantage of other training sets, such as data generated by ethical, white hat hackers.

The advantage bought to training ML model 279C in a central location is that broad trends can be identified, and screened for, by the system, even before the customer network is exposed to those malicious or probing requests.

After ML model 279C is transferred to the edge-based Autonomous Access Server 273 and loaded as ML model 279E, ML model 279E may be further trained using the customer's existing network infrastructure logs, such as from load balancers, web server, and other enterprise grade platforms.

An advantage of training ML model 279E at the edge is that ML model 297E is customized to the specific customer.

Eventually, as patterns of worthless requests change, the model will need to be retrained. Retraining can be period driven or performance driven.

When to retrain an ML model may be based on situations such as:

A threshold of false positives. False positives, i.e., when a legitimate user is flagged as a high risk and thus denied network access, degrade the ability for users to use the system, so when false positives occur, then ML models may need to be retrained.

When new applications are onboarded, the new applications may be an additional source of features and ML models may need to be retrained to find and classify new patterns. For purposes of this discussion, the phrase "new application" also includes new versions of applications.

When a large enough batch of requests that are not clearly risky or safe (such as having risk levels of "medium" or "uncertain"), then the ML models may need to be retrained to recognize patterns in that data.

Other performance-based triggers to retraining will be understood by those skilled in the art.

An advantage of training and retraining is that the ML model is that the time between new attacks and protection for multiple customers is short. A general model, alone, may not be as adaptive to new attacks. A model trained to the specific customer, without retraining by use of may be able to learn from attacks on the customer's network after they have occurred; however, the two-part training, combined with retraining, permits increased resilience against new malicious or probing techniques.

Authentication Journey

Figure 2B:
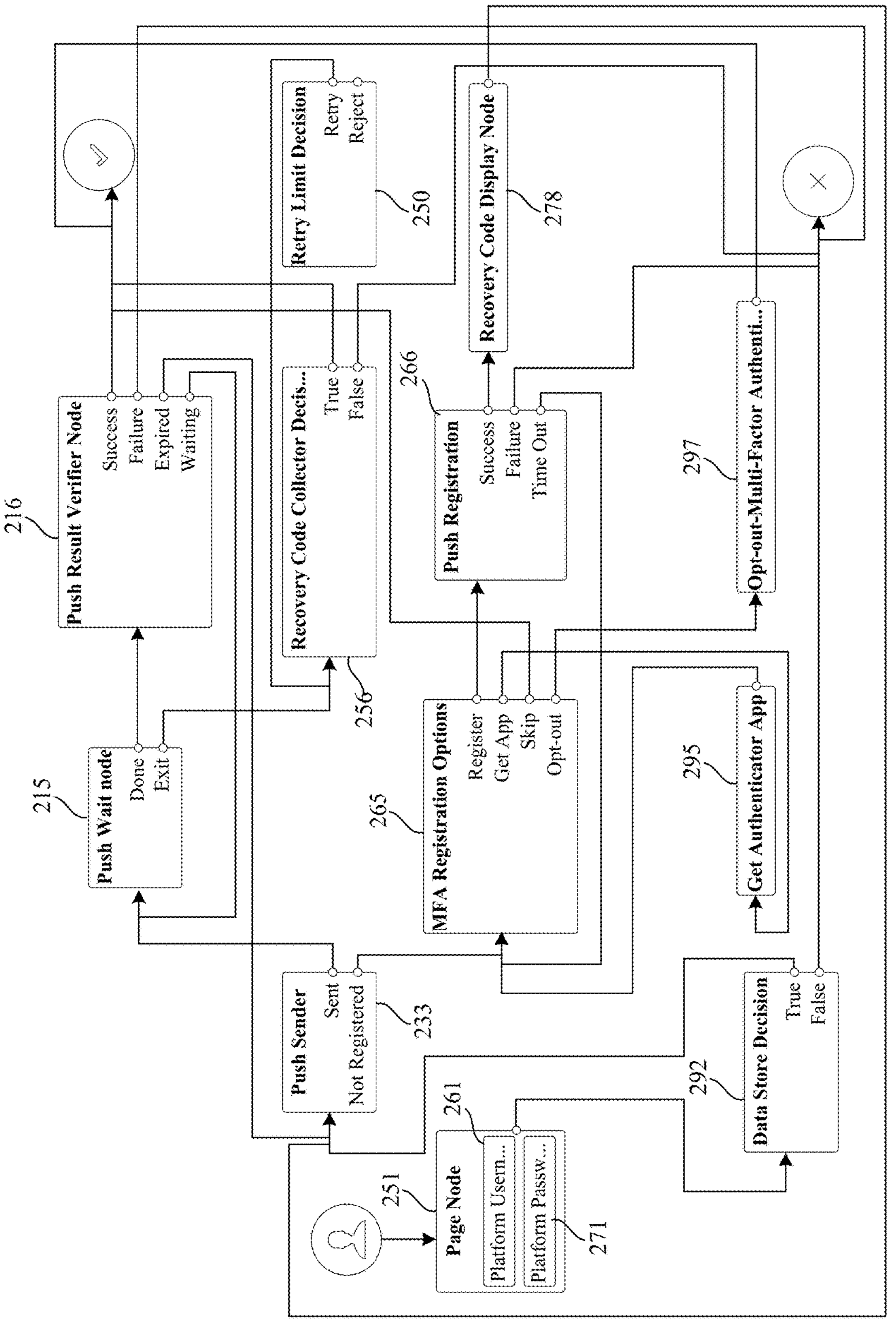
FIG. 2B illustrates an authentication journey for push notification.

FIG. 2B illustrates an example Authentication Journey Tree that is implemented using ForgeRock Access Management. Traversing an authentication journey is a complex undertaking. Initiating an authentication journey for a malicious or probing request from a bot wastes resources. Bots, unlike humans, can provide hundreds or thousands of requests in a few minutes. Pre-screening and thwarting or redirecting even a portion of bot requests saves resources for legitimate requests.

Journey tree comprises nodes that represent the actions and decisions that Access Management 267 would take when performing user authentication. A complete list of nodes, and brief description of the authentication options they represent, is provided as part of Section Authentication Journey Nodes, below.

The tree itself represents the potential journeys that user could take, starting at a login page requesting username and password, represented by Page node 251. The username and password may not match (Data Store Decision 292 false, leading to failure), or may match (Push Sender 233 sends into for Multi Factor Authentication (MFA), which is verified by Push Result Verifier Node 216 before leading to success), or the user may not be previous registered in which case the user can register with the system, can use a MFA device to register, or can opt out (MFA registration Options node 265). If a password was forgotten, login may require the use of a recovery code (Recovery Code collector Decision 256).

Journey Tree represents a relatively simple authentication journey. More complex authentication techniques, such as Single Sign On (SSO) and One Time Passwords (OTP), can also be part of journey tree which would require more even more complexity.

Thus, catching a percentage of worthless requests at Identity Gateway 253, by scoring the risk that those requests are from malicious or probing bots, lowers the total cost of processing authentication requests.

Identity Gateway Interactions

Figure 3A:
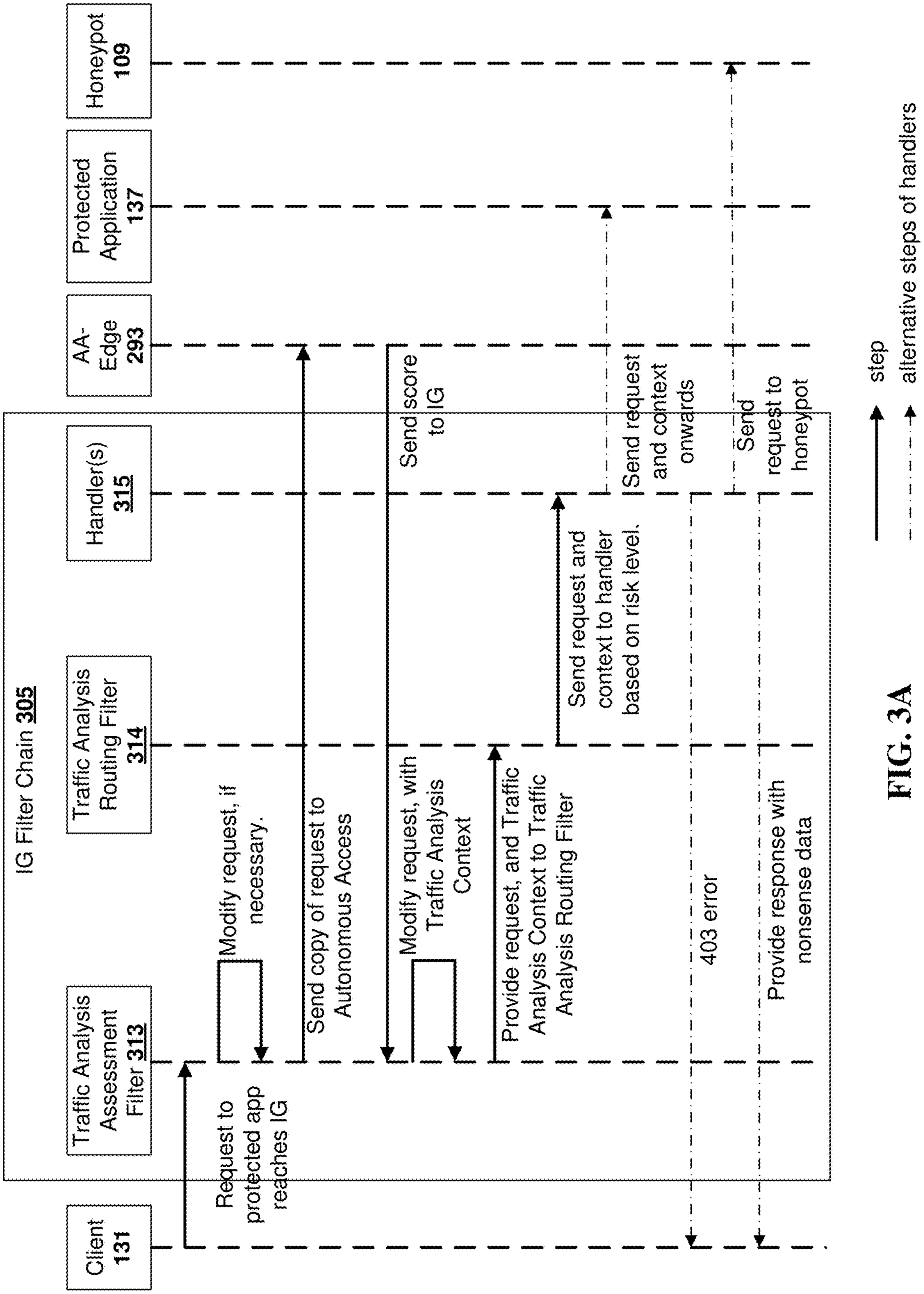
FIG. 3A illustrates a message flow diagram that describes how the different filters and handlers in the Identity Gateway example interact with the system.

FIG. 3A illustrates a message flow diagram that describes how the different filters and handlers in the Identity Gateway example interact with the system.

The message flow diagram includes client 131, Identity Gateway (IG) filter chain 305 Autonomous Access 293, Protected Application 137, and Honeypot 109.

IG filter chain 305, part of an Identity Gateway, includes, Traffic Analysis Assessment Filter 313, Traffic Analysis Routing Filter 314, one or more handlers 315.

Traffic Analysis Assessment Filter 313 may be configured to process requests made to particular endpoints, such as protected application 137. Traffic Analysis Assessment Filter 313 or another component positioned at the edge can be configured to send a copy of requests to Autonomous Access 293 for scoring using a hosted ML model, and to receive a score computed by the ML model. Traffic Analysis Assessment Filter 313 may also be used to categorize levels of risk, based on a received score. Example properties of Traffic Analysis Assessment Filter 313 are shown in detail in FIG. 3B. Alternatively, the ML model can return categorical results.

Traffic Analysis Assessment Filter 313 may also record the level of risk as a Traffic Analysis Context added to the request. Example properties of Traffic Analysis Context are shown in detail in FIG. 3C.

Traffic Analysis Routing Filter 314 may be configured to provide the request to one of handlers 315 based on the level of risk posed by the request. In some implementations, Traffic Analysis Routing Filter 314 may use the level of risk expressed by a Traffic Analysis Context. Example properties of Traffic Analysis Routing Filter 314 are shown in more detail as part of FIG. 3D.

At the first step, a request made by client 131 reaches IG filter chain 305, and is processed by Traffic Analysis Assessment Filter 313.

At the second step, Traffic Analysis Assessment Filter 313 determines whether to modify the request by transforming data that is part of the request, or by adding context to the request. Traffic Analysis Assessment Filter 313 acts in accordance with its determination.

In general, contexts are available to downstream routes, and can be used in later routing decisions. The context added by Traffic Analysis Assessment Filter 313 is available to all downstream filters that may need to use the information/score.

As a transformation example, if a user identifier contained as part of the request uses foreign characters that are not recognized by Autonomous Access 293, those characters may be modified or removed by Traffic Analysis Assessment Filter 313.

As an example of adding context, Internet requests usually do not contain geolocation information with respect to the client (latitude/longitude pairs, city, country, and the like). However, geolocation information can be extrapolated by IP geolocation techniques. If geolocation information is being used by a ML model hosted by Autonomous Access 293, Traffic Analysis Assessment Filter 313 can add the geolocation information as context information.

At the third step, Traffic Analysis Assessment Filter 313 provides a copy of the request (whether modified or not) to Autonomous Access 293. Autonomous Access 293 provides features of the request as input into one or more hosted ML models. Autonomous Access 293 may generate a score based on the one or more hosted ML models, based on predictions or estimates on the risk of the request.

At the fourth step, Autonomous Access 293 provides the score to Traffic Analysis Assessment Filter 313.

At the fifth step, Traffic Analysis Assessment Filter 313 adds a Traffic Analysis Context (which is discussed in greater detail below, with respect to FIG. 3C). This step may involve comparing the score to risk level thresholds configured in the Traffic Analysis Assessment Filter properties, and assigning the risk level based on the score. This step may also involve adding other metadata related to the score.

As an example of metadata, a high risk level may be explainable based on certain categories of anomaly. For example, suppose the current request from a user identifier originates from Galveston, Texas in the United States, but the last request from the same user identifier was five minutes ago and originated from Seoul in South Korea. Since Galveston and Seoul are separated by over 7000 miles, the user would have apparently traveled at a rate of over 1400 miles per minute. Metadata indicating that the user has apparently traveled at an almost impossible rate may be added as metadata.

At the sixth step, Traffic Analysis Assessment Filter 313 provides the request and Traffic Analysis Context to Traffic Analysis Routing Filter 314.

Traffic Analysis Assessment Filter 314 may determine which of Handler 315 will receive the request, based at least on the risk level.

At the seventh step, Traffic Analysis Routing Filter may send the request to the determined handler amongst Hander 315.

What occurs in the next step is based, at least in part, on which of handler 315 received the request. The next step may also be based, at least in part, on the metadata in the context.

If a low-risk handler received the request, the request may be simply forwarded on to protected application 137.

If a medium-risk handler received the request, the handler may require authentication (for example, by Access Management 267 as earlier discussed in FIG. 2A) via an authentication journey, step-up authentication (for example, Multifactor Authentication (MFA)), before forwarding the request to protected application 167. Medium-risk handler provide information with the request that is used by the authentication or authorization journey, such as those found in Traffic Analysis Context.

If a high-risk handler received the request, the handler may have several options. The high-risk handler may refuse to process the request, and reply to the client with a 403 error. The high-risk handler may send the request to honeypot 109 so that the attacker activity can be monitored, or respond to the client by sending incorrect/nonsensical data so that an attacker's intelligence gathering attempts are given disinformation.

If an uncertain handler ("uncertain" being a risk level in itself) or unknown handler receives the request, the request may be the result of misconfiguration of a network system, error in transmission, a new type of probing request, and a variety of other reasons. The request could be refused out of hand by 403 error. The request may be processed to avoid undue interruptions to the network due to false-positive identifications. In this case, the requests and interactions with protected application 137 may continue to be monitored for future ML model training.

Traffic Analysis Assessment Filter

FIG. 3B illustrates example properties of a Traffic Analysis Assessment Filter.

Traffic Analysis Assessment Filter can include properties that associate the filter with a particular endpoint such as endpoint 313*a* and endpointHandler 313*b*, the level of detail in a risk report such as verbose 313*c*, thresholds such as 313*d*, assessments such as 313*e*.

Not all properties must be manually set. For example, thresholds 313*d* may default to those in Auto Access. Traffic Analysis Assessment Filter permits setting the thresholds for risk level, so that a customer may tune how the technology responds based on customer-specific risk appetite.

Additionally, Traffic Analysis Assessment Filter permits the type of risk assessments to be measured. Assessment 313*e* may include anomaly detection, bot detection, and other use cases.

Traffic Analysis Assessment Filter may also be configured to supply features to Autonomous Access, when performing the third step of the message diagram. The features could be provided as value of those features, or locations for Autonomous Access to retrieve those features.

Some items described as set in this filter may, in some implementations, may be set in other configuration files, including configuration files for other system components (e.g. thresholds could be configured in Auto Access rather than the IG.)

Traffic Analysis Context

FIG. 3C illustrates example properties of a Traffic Analysis Context.

Traffic Analysis Context can include properties that are associated with a request such as a riskScore 344*a* and a reasonText 344*b*.

RiskScore 344*a* provides a textual description of risk levels. Future levels, and unknown values can also be addressed by risk level 344*a*.

ReasonText 344*b* provides a textual explanation of the risk score.

Traffic Analysis Routing Filter

FIG. 3D illustrates example properties of a Traffic Analysis Routing Filter.

Traffic Analysis Routing Filter can include properties that direct requests to different handlers based on information from Traffic Analysis context Filter, such as low 314*a*, medium 314*b*, high 314*c*, uncertain 314*d*, and unknown 314*e* risk levels.

The riskHandlers map maps the risk-score to the handler responsible for routing the request. If new values to the Traffic Analysis Context Filter property are introduced, then the riskHandlers map can be extended.

The unknown handler (referred to by property unknown 314*e*) is expected to handle the request if the received riskScore is not present in the config map.

Some items described as set in this filter may, in some implementations, may be set in other configuration files, including configuration files for other system components.

Position and Edge Deployment

When compared to a vanilla transmission of requests to applications, latency may be introduced by the risk-scoring technology described above. Latency may be a challenge to providing a timely system response to the user.

Latency factors include scoring every inbound request, an additional network hop to reach the ML model, the risk score processing time by the ML model, and potential delays imposed by updates when a new ML model has been centrally trained and is being loaded to the edge.

Each latency factor can be mitigated.

To address latency from each inbound request being scored, risk-scores may be cached based on inbound request features. Thus, rescoring requests from the same client, multiple times, can be avoided.

To address latency from an additional network hop to reach the ML model, the Edge-based Autonomous Access server hosting the ML model may be physically located in close geographic proximity to the IG host, and on the same network. Thus, the latency based on the additional network hop can be reduced.

To address latency from the risk score processing time by the ML model, the ML model can be configured to not produce risk-score response verbose text. Thus, latency based on processing time can be reduced.

To address latency from retraining the model at the edge, ML model training is not dynamic (live). The Edge-deployed Autonomous Access may continue to use the previously loaded ML model until the retrained ML model has been fully loaded. Once the retrained ML model is fully loaded, new requests may be directed to the retrained ML model rather than the previously loaded ML model. Batch training and deployment facilitates multiple instances at the edge.

Pre-Screening Reverse Proxy Alternatives

Other alternatives to IG that follow the spirit of the disclosed technology can be grasped by those in the art.

For example, modular agents that are plugged into proxies may be used with edge-deployed ML models to perform risk analysis about requests. Underlying web servers, such as MS Internet Information Services (IIS), Nginx, and the like, or underlying containers, such as Tomcat, Jerry, WebSphere, and the like, may have modular agents that obtain the risk score.

However, unlike the IG implementation, those modular agents may rely on the underlying proxy to reroute traffic or otherwise act upon the risk analysis, rather than have the native capabilities, or the modular agents themselves would require core logic to be configured to support rerouting.

Other, more flexible security products that provide broad configurability options may be also used with edge deployed models.

Additional Advantages

The edge-deployed technology as presented provides several advantages when supplementing other approaches to security.

With respect to access management, access management may be generally focused on authentication and authorization. The process of access management may involve consultation with multiple systems (e.g. databases, legacy systems) to determine whether access should or should not be granted, and the process itself consumes resources. Finally, the access manager itself may be the subject of probing.

Managing traffic at the edge permits a broader spectrum of oversight. Useful features for detecting bots may be found in more requests than those directed to an access manager. Worthless request traffic that is screened at the edge is not traffic that consumes core network resources though initiating access management processes. Early detection of uncertain requests provides more flexibility in how to handle those requests, and may avoid exposing features of the access manager that can be exploited by a later attack.

Timing observations can also be disrupted when requests, even if part of a previously authenticated session, are determined to be anomalous. Such disruption occurs when anomalous requests can be rejected before they reach core systems and/or held to create artificial delay.

Other network infrastructure components, such as load balancers, firewalls, content-delivery networks, also have their own characteristics. The technology generally provides the advantages of:

- Defense-in-depth: One component may succeed where another fails.
- Network component-based security: Network components can handle their own security concerns and block requests at the TCP/HTTP levels.
- Comprehensive training: A model that is based not only from local network component logs, but also based on audit and access logs for hundreds of other enterprise customers provides for exceptionally powerful models.

Additional Use Cases

Some other uses cases in development may include:

Profiling use cases (profiling user customer usage behavior, profiling application usage patterns, profiling atypical application usage for fraud prevention), monitoring use cases (periodic analysis of network/infrastructure/load), authorization use-cases (screening for user authorization before reaching the authorization manager), data leakage use cases (screening outbound responses for sensitive data).

Specific examples of use cases other than bot detection include detecting port scanning, detecting searching for endpoints, detecting malformed requests (which may occur from attacks such as Account Takeover).

The various use cases are not confined to detection by monitoring a single request type, but instead may be detected by any of the request types of requiring authentication, requiring authorization, previously authenticated, or requiring neither authentication nor authorization. Some contemplated use cases may monitor more than one request type.

Computer System

Figure 4:
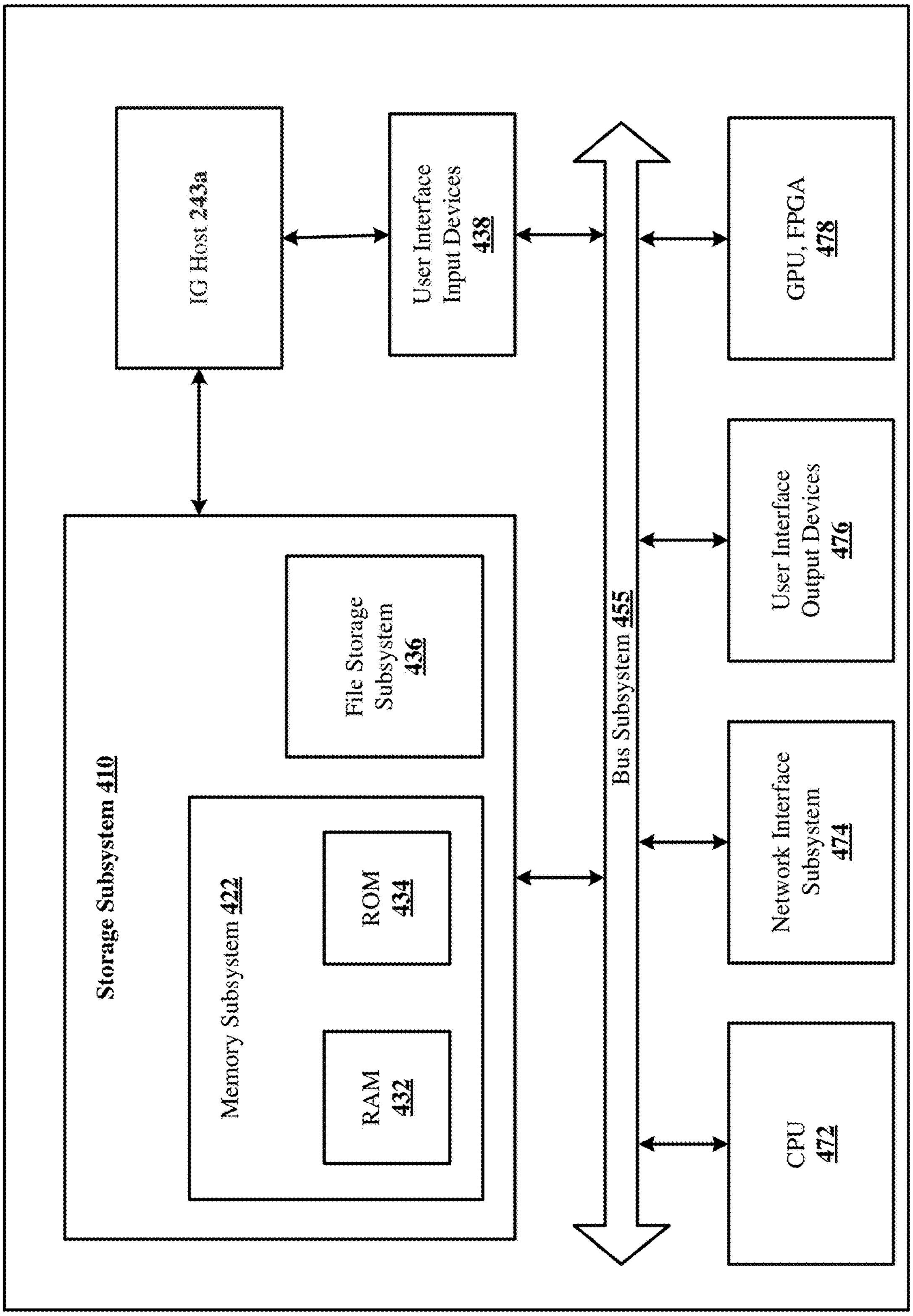
FIG. 4 is a simplified block diagram of a computer system that can be used for preventing network attackers from gaining actionable intelligence about a network, and prevent resource consumption through worthless requests.

FIG. 4 is a simplified block diagram of a computer system 400 that can be used for preventing network attackers from gaining actionable intelligence about a network, and prevent resource consumption through worthless requests. Computer system 400 includes at least one central processing unit (CPU) 472 that communicates with a number of peripheral devices via bus subsystem 455, and IG host 243*a* for delegation of authority using bearer tokens, as described herein. These peripheral devices can include a storage subsystem 410 including, for example, memory devices and a file storage subsystem 436, user interface input devices 438, user interface output devices 476, and a network interface subsystem 474. The input and output devices allow user interaction with computer system 400. Network interface subsystem 474 provides an interface to outside networks, including an interface to corresponding interface devices in other computer systems. IG host 243*a* of FIG. 2 is communicably linked to the storage subsystem 410 and the user interface input devices 438.

User interface input devices 438 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 400.

User interface output devices 476 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 400 to the user or to another machine or computer system.

Storage subsystem 410 stores programming and data constructs that provide the functionality of some or all of the modules and methods described herein. Subsystem 478 can be graphics processing units (GPUs) or field-programmable gate arrays (FPGAs).

Memory subsystem 422 used in the storage subsystem 410 can include a number of memories including a main random-access memory (RAM) 432 for storage of instructions and data during program execution and a read only memory (ROM) 434 in which fixed instructions are stored. A file storage subsystem 436 can provide persistent storage for program and data files, and can include a hard disk drive, a floppy disk drive along with associated removable media, a CD-ROM drive, a DVD drive, a Blu-ray drive, an optical drive, or removable media cartridges. The modules implementing the functionality of certain implementations can be stored by file storage subsystem 436 in the storage subsystem 410, or in other machines accessible by the processor.

Bus subsystem 455 provides a mechanism for letting the various components and subsystems of computer system 400 communicate with each other as intended. Although bus subsystem 455 is shown schematically as a single bus, alternative implementations of the bus subsystem can use multiple busses.

Computer system 400 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 400 depicted in FIG. 4 is intended only as a specific example for purposes of illustrating the preferred embodiments of the present invention. Many other configurations of computer system 400 are possible having more or fewer components than the computer system depicted in FIG. 4.

Authentication Journey Nodes

Understanding an authentication journey helps us appreciate the benefit of pre-screening at the edge, prior to entry into an authentication journey. Again, the technology disclosed applies to many request types and is not limited to requests that would trigger an authentication journey. Authentication journey tree as shown in FIG. 2B includes Page node 251, Platform Username node 261, Platform Password node 271, Data Store Decision node 292, Push Sender node 233, Push Wait node 215, Push Result Verifier node 216, Recovery Code Collector Decision node 256, Retry Limit Decision node 259, MFA Registration Options node 265, Push Registration node 266, Recovery Code Display node 278, Get Authenticator App node 295, and Opt-out Multi-Factor Authentication node 297.

Page node 251 includes Platform Username Node 261 and Platform Password node 471. Platform Username Node 261 prompts the user to enter their username, and stores it in a configurable state attribute. Platform Password node 271 prompts the user to enter their password and stores the input in a configurable state attribute.

Data store decision node 292 verifies that the username and password values match those in the data store configured for the realm.

Push sender node 233 sends push notification messages to a device for multi-factor authentication. To determine whether the user has a registered device, the flow must have included the username in the shared state, for example, by using a Platform Username node.

Push Wait node 215 pauses the authentication for the specified number of seconds during the processing of a push authentication request.

Push Result Verifier node 216 works with the Push Sender node to validate the user's response to a previously sent push notification message.

Recovery Code Collector Decision node 256 lets users authenticate with a recovery code provided when registering a device for multi-factor authentication. When the user loses their registered device, they can use a recovery code as an alternative method for authentication.

Retry Limit Decision node 250 permits the specified number of passes through to the "retry" outcome path before continuing evaluation along the "reject" outcome path.

MFA Registration Options node 265 lets the user register a multi-factor authentication device or skip the registration process. The node requires the username of the identity to update and the type of MFA device.

Push Registration node 266 provides a way to register a device, such as a mobile phone for multi-factor authentication using push notifications. The node requires the username of the identity to update; for example, by using a Platform Username node.

Recovery Code Display node 278 retrieves generated recovery codes from the transient state and presents them to the user, for safe-keeping. The codes can be used to authenticate if a registered device is lost or stolen. Generated recovery codes are inserted into transient state when evaluation continues along the Success outcome path of the MFA nodes configured to generate recovery codes. Connect this node to the Success outcome path to display the codes.

If no recovery codes are available in transient state, evaluation continues along the only outcome path, and nothing is displayed to the user.

Get Authenticator App node 295 displays information to obtain an authenticator application from the Apple App Store or the Google Play Store.

Opt-out Multi-Factor Authentication node 297 sets the "skippable" attribute in the user's profile, which lets them skip MFA. The node requires the username of the identity to update, and the type of MFA device.

Particular Implementations

We describe some implementations of the technology disclosed for screening malicious and probing requests, collectively worthless requests, directed to a protected application. The technology disclosed can be practiced as a method, a non-transitory computer readable medium impressed with instructions to carry out actions of the method, or as a system adapted to carry out the actions of the method.

One implementation discloses a method of screening worthless requests using an identity gateway (IG) positioned as a network edge component on a network, the screening being invoked before starting an authentication or authorization journey or other resource consuming interaction with the protected application. The method includes provisioning a trained ML classifier at an edge server accessible by the IG, wherein the trained ML classifier accepts a variable length array of features available when a request to establish an authorized session is received and outputs a score that predicts whether the request is a worthless request. The method also includes receiving the request, from a client, to establish an authorized session at the IG, assigning the array of features to the request, processing the features using the trained ML classifier to generate a score, determining by comparing the score to a threshold that the request is a worthless request and, responsive to the determining, limiting the worthless request at the network edge so that it does not invoke the authorization journey or the other resource consuming interaction that establishes the authorized session.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In some implementations, retraining the trained ML classifier occurs on a periodic basis. The period may be less than or equal to a biweek, a week, a day, or even an hour.

In some implementations, retraining the trained ML classifier occurs on an event-driven basis. The event may be meeting a threshold of false positives, or previously determined scores being classified into risk levels and the event is the determined score and previously determined scores meeting a threshold number or percentage of classifications as uncertain.

In many implementations, the trained ML classifier was trained by a training set including data obtained from a cloud-based service audit log. In some implementations, the audit log provides a history of previous end to end request/response flows between clients and protected applications/endpoints.

In many implementations, the trained ML classifier was trained on a training set including data obtained from a cloud-based service access log.

In some implementations, the trained ML classifier was trained on a second training set that includes data obtained from a local network infrastructure log. In some implementations, the local network infrastructure log comprises information from a load balancer. In some implementations, the local network infrastructure log comprises information from a web server.

In some implementations, the IG comprises a filter chain with a traffic analysis assessment filter and a traffic analysis routing filter.

In some implementations, the method further includes receiving, at the IG, another request, scoring, by the trained ML classifier, another request resulting in a second score, and based on the second score, invoking an authentication journey.

In many implementations, protected application is hosted on a web server.

In some implementations, the edge server hosts an Autonomous Access (AA) instance. In some implementations, the AA instance further trains the trained ML classifier with observations comprising the features, the observations obtained from the network. In some implementations, the edge server is one of a plurality of edge servers; and the IG is hosted on one of a plurality of IG hosts. In some of those implementations, each of the plurality of IG hosts is served by a respective edge server of the plurality of edge servers.

In many implementations, the trained ML classifier is obtained from a cloud-based platform. In some implementations, a training set used to train the trained ML classifier is based on set of requests, the request made to a plurality of networks served by the cloud-based platform.

In some implementations, the edge component is a Web Policy Agent instead of an Identity Gateway.

In some implementations, the edge component is a Java Policy Agent instead of an Identity Gateway.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

We claim as follows:

1. A method of screening malicious and probing requests to establish an authorized session, collectively worthless requests, directed to a protected application, using an identity gateway (IG) positioned as a network edge component on a network, the screening being invoked before starting an authentication or authorization journey or other resource consuming interaction with the protected application, the method comprising:

provisioning a trained ML classifier at an edge server accessible by the IG, wherein the trained ML classifier accepts a variable length array of features available when a request to establish an authorized session is received and outputs a score that predicts whether the request is a worthless request, previously determined scores being classified into risk levels;

receiving the request, from a client, to establish an authorized session at the IG;

assigning the array of features to the request;

processing the array of features using the trained ML classifier to generate the score;

determining by comparing the score to a threshold that the request is a worthless request;

responsive to the determining, limiting the worthless request at a network edge so that the worthless request does not invoke the authentication or authorization journey or the other resource consuming interaction that establishes the authorized session; and retraining the trained ML classifier when a quantity of determined scores and previously determined scores meet a threshold quantity of classifications as uncertain or a combined percentage of determined score and previously determined scores meet a threshold percentage of classifications as uncertain.

2. The method of claim 1, wherein the edge server hosts an Autonomous Access (AA) instance, wherein the AA instance further trains the trained ML classifier with observations comprising the array of features, the observations obtained from the network, wherein the edge server is one of a plurality of edge servers; and the IG is hosted on one of a plurality of IG hosts.

3. The method of claim 1, wherein:

the score is placed into a risk level from a plurality of risk levels;

a set of candidate responses, based on the placement of the score into the risk level from the plurality of risk levels, comprise at least three of the following candidates:

permitting access to the protected application;

requesting reauthorization;

requesting step-up authentication or authorization;

redacting response content being sent to the client;

response steps comprising:

logging the request as an uncertain request, evaluating the uncertain request to determine a cause of uncertainty, and retraining the trained ML classifier to account for the cause, throttling requests;

logging the request for use in future training of the trained ML classifier; and denying access to the protected application; and the method further comprising responding with a candidate response from the set of candidate responses.

4. The method of claim 3, wherein based on the placement of the score into the risk level, the candidate response comprises denying access to the protected application and the responding includes responding to the request with a 403 Forbidden response.

5. The method of claim 3, wherein the candidate response includes, based on the placement of the score into the risk level and a request frequency, at least one of:

routing the request to a honeypot environment; or responding with a success code and with invalid data, whereby maliciously-motivated surveillance for future attacks on the network receives disinformation.

6. The method of claim 1, wherein the IG comprises a filter chain with a traffic analysis assessment filter and a traffic analysis routing filter.

7. The method of claim 1, wherein the request is a first request, the method further comprising:

receiving, at the IG, a second request;

scoring, by the trained ML classifier, the second request resulting in a second score; and based on the second score, invoking an authentication journey.

8. The method of claim 1, further comprising:

obtaining the trained ML classifier from a cloud-based platform; and using a training set, based on a set of requests, to train the trained ML classifier, the request made to a plurality of networks served by the cloud-based platform.

9. The method of claim 1, further comprising retraining the trained ML classifier when a quantity of false positive classifications reaches a threshold quantity.

10. The method of claim 1, wherein the trained ML classifier is trained by a training set including data obtained from a cloud-based service audit log, wherein the cloud-based service audit log provides a history of previous end to end request/response flows between clients and protected applications/endpoints.

11. The method of claim 1, wherein the trained ML classifier is trained on a first training set including data obtained from a cloud-based service access log, wherein the trained ML classifier is trained on a second training set that includes data obtained from a local network infrastructure log.

12. A non-transitory computer readable storage medium impressed with computer program instructions to screen malicious and probing requests to establish an authorized session, collectively worthless requests, directed to a protected application, using an identity gateway (IG) positioned as a network edge component on a network, the screening being invoked before starting an authentication or authorization journey or other resource consuming interaction with the protected application, the instructions, when executed on a processor, implement a method comprising:

provisioning a trained ML classifier at an edge server accessible by the IG, wherein the trained ML classifier accepts a variable length array of features available when a request to establish an authorized session is received and outputs a score that predicts whether the request is a worthless request, the IG comprising a filter chain with a traffic analysis assessment filter and a traffic analysis routing filter;

receiving the request, from a client, to establish an authorized session at the IG;

assigning the array of features to the request;

processing the array of features using the trained ML classifier to generate the score;

determining by comparing the score to a threshold that the request is a worthless request; and responsive to the determining, limiting the worthless request at a network edge so that the worthless request does not invoke the authentication or authorization journey or the other resource consuming interaction that establishes the authorized session.

13. The non-transitory computer readable storage medium of claim 12, wherein the edge server hosts an Autonomous Access (AA) instance, wherein the AA instance further trains the trained ML classifier with observations comprising the array of features, the observations obtained from the network, wherein the edge server is one of a plurality of edge servers; and the IG is hosted on one of a plurality of IG hosts.

14. The non-transitory computer readable storage medium of claim 12, wherein:

the score is placed into a risk level from a plurality of risk levels;

a set of candidate responses, based on the placement of the score into the risk level from the plurality of risk levels, comprise at least three of the following candidates:

permitting access to the protected application;

requesting reauthorization;

requesting step-up authorization;

redacting response content being sent to the client;

response steps comprising:

logging the request as an uncertain request, evaluating the uncertain request to determine a cause of uncertainty, and retraining the trained ML classifier to account for the cause;

throttling requests;

logging the request for use in future training of the trained ML classifier; and denying access to the protected application; and the method further comprising responding with a candidate response from the set of candidate responses.

15. The non-transitory computer readable storage medium of claim 14, wherein based on the placement of the score into the risk level, the candidate response comprises denying access to the protected application and the responding includes responding to the request with a 403 Forbidden response.

16. The non-transitory computer readable storage medium of claim 14, wherein the candidate response includes, based on the placement of the score into the risk level and a request frequency, at least one of:

routing the request to a honeypot environment; or responding with a success code and with invalid data, whereby maliciously-motivated surveillance for future attacks on the network receives disinformation.

17. The non-transitory computer readable storage medium of claim 12, wherein the request is a first request, the method further comprising:

receiving, at the IG, a second request;

scoring, by the trained ML classifier, the second request resulting in a second score; and based on the second score, invoking an authentication journey.

18. The non-transitory computer readable storage medium of claim 12, the method further comprising:

obtaining the trained ML classifier from a cloud-based platform; and using a training set, based on a set of requests, to train the trained ML classifier, the request made to a plurality of networks served by the cloud-based platform.

19. A system for screening malicious and probing requests to establish an authorized session, the system including a processor, memory coupled to the processor and program instructions from the non-transitory computer readable storage medium of claim 12.

* * * * *